United States Patent [19]

Myers et al.

[11] 4,311,631
[45] Jan. 19, 1982

[54] LOW EMISSION FOUNDRY BINDER SYSTEM

[75] Inventors: Marion M. Myers; William J. Tellefsen, both of Milwaukee, Wis.

[73] Assignee: Delta Oil Products Corporation, Milwaukee, Wis.

[21] Appl. No.: 77,182

[22] Filed: Sep. 20, 1979

[51] Int. Cl.$^3$ .............................................. C08L 61/06
[52] U.S. Cl. .................................................... 260/38
[58] Field of Search .......................... 260/38, DIG. 40

[56] References Cited

U.S. PATENT DOCUMENTS

| | | | |
|---|---|---|---|
| 3,409,579 | 11/1968 | Robins | 260/38 |
| 3,726,867 | 4/1973 | Robins | 260/38 |
| 4,051,092 | 9/1977 | Holik et al. | 260/DIG. 40 |
| 4,072,649 | 2/1978 | Kubens | 260/38 |
| 4,079,031 | 3/1978 | Sardessai et al. | 260/DIG. 40 |

Primary Examiner—Lewis T. Jacobs
Attorney, Agent, or Firm—Cook, Wetzel & Egan, Ltd.

[57] ABSTRACT

Foundary binder, substantially free of inert hydrocarbon solvents, is comprised of a mixture of low molecular weight methylolated phenolic components and a reactive diluent. The binder is mixed with sand and cured with a polyisocyanate in the presence of a catalyst.

21 Claims, No Drawings

LOW EMISSION FOUNDRY BINDER SYSTEM

The present invention relates to foundry binder compositions, and particularly to foundry binder compositions used in making cores and molds which are hardened at room temperature. More particularly, the present invention relates to foundry binders comprising a mixture of a low molecular weight methylolated phenolic component and a selectively reactive diluent. The binder is cured with polyisocyanates, preferably in the presence of a catalyst. The selectively reactive diluents employed in the binder compositions of the present invention are isocyanate reactive, and have a relatively low vapor pressure, thus reducing emissions and eliminating the need for inert hydrocarbon solvents.

BACKGROUND AND PRIOR ART

In the foundry art, molds and cores used in making metal castings are prepared from an aggregate such as sand and a curable binder. In recent years, the curable binders of the no-bake type, i.e., those requiring little or no additional heat other than that available at ambient temperatures, have gained wide acceptance in the foundry art. Typically, to be useful as a no-bake binder, the system must have a sufficient bench or work life to permit shaping of the foundry mix, must rapidly develop good tensile strength when cured at room temperature and must provide rapid stripping of the cores. In addition, the binder system should work equally well on all foundry aggregates, be relatively insensitive to moisture and give castings without surface defects with all metal types.

Phenol-formaldehyde resins have been crosslinked with diisocyanates for use in the coatings and adhesives industries, and phenol-formaldehyde resins crosslinked with isocyanates have been used in the foundry process for mold and core making.

U.S. Pat. Nos. 3,409,579; 3,432,457; 3,485,797; 3,676,392; 3,702,316; and 3,726,867 teach the use of special phenol-formaldehyde resins which contain benzylic ether linkages (FIG. I, portion m) which are prepared at temperatures in excess of 100° C. with special divalent metal ion catalysts.

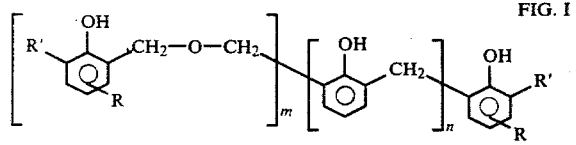

FIG. I

These special resins are described as high molecular weight phenolic resins containing more benzylic ether linkages than methylene linkages between the phenol rings, i.e., m is greater than n in FIG. I, and the number of repeating aromatic rings is at least 3 and preferably 4 to 10. In addition these resins are described as being essentially anhydrous in that they contain less than 5% and preferably less than 1% water.

Phenolic resoles are normally prepared using an alkaline catalyst such as sodium hydroxide with a molar ratio of formaldehyde to phenol greater than one. This reaction can be divided into two temperature ranges; (1) reaction temperatures in excess of 90° C., which yields conventional resole resins containing methylene bridges (FIG. II),

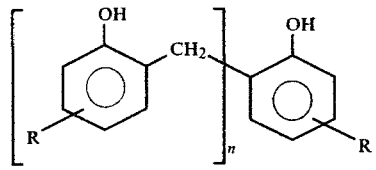

FIG. II wherein the average n is typically 3 or more, and (2) reaction temperatures less than 90° C. The latter temperature condition will yield low molecular weight materials where the degree of advancement will depend on the actual temperature used and the length of the reaction. The molecular weight of these low temperature alkaline-catalyzed one-step phenolic mixtures is a function of the degree of reaction. These materials may range from mixtures of mononuclear methylolated phenols of the type shown in FIG. III with molecular weights of 125–150, and up to resins with molecular weights of 1,000 or greater, depending upon time of reaction.

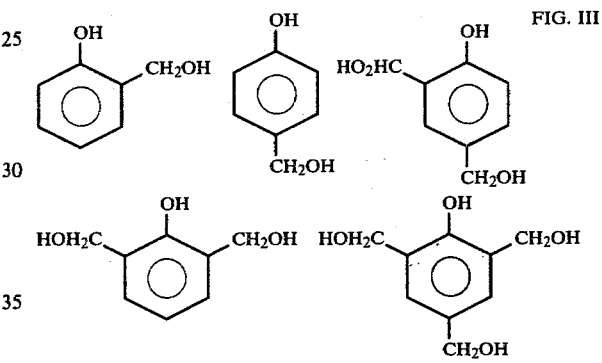

FIG. III

Binder systems based on such low molecular weight methylolated phenols are described in U.S. Pat. No. 4,148,777.

Binder systems based on resole phenolic resins containing at least 5% water, preferably combined with polyether polyols, crosslinked with polyisocyanates are described in U.S. Pat. No. 4,079,031.

The resole resins and the benzylic ether resins of the prior art phenolic urethane foundry binder systems required the use of hydrocarbon solvents and generally required both a polar solvent and a non-polar aromatic hydrocarbon solvent to provide a mutually compatable solvent system for uniform dispersability of the binder system over the aggregate, see for example, U.S. Pat. No. 3,726,867. Protic or aprotic solvents are suitable for phenolic resins, but are unsuitable with the polyisocyanates, which require inert aromatic hydrocarbon solvents. Consequently, in the prior art systems, hydrocarbon solvents were combined with moderately polar protic or aprotic solvents to provide a compatable solvent system to insure adequate miscibility between the polyisocyanate and phenolic binder during the phenolic isocyanate reaction.

The solvent systems employed by the prior art foundry binder systems provide binders which may be readily mixed with the sand aggregates and cured to give molds and cores of reasonably high tensile strengths, but during the foundry process (including the mixing of the binder with the sand, the shaping, the curing, the stripping, the aging, and the metal pouring), the hydrocarbon solvents volatilize to a significant extent. The volatilization of the hydrocarbon solvents during the foundry process creates unpleasant and uncomfortable conditions for the foundry workers in certain areas. While such undesirable working conditions may, at times, be corrected by ventilation systems, the discharge of such hydrocarbon vapors into the atmosphere is also objectionable from an environmental point of view.

The present invention overcomes the problems of the prior art by providing a foundry binder system which is free of pure hydrocarbon solvents and uses in lieu thereof reactive diluents which are reactive with the isocyanate component of the foundry binder system. Moreover, the preferred diluents of the present invention have a relatively low vapor pressure, i.e., lower than the comparable hydrocarbon solvents. As a result of using the selectively reactive diluents, the present invention provides a foundry binder system which may be substituted for existing foundry binder systems with the advantage of substantially lowering the levels of emissions during the foundry process.

THE PRESENT INVENTION

The present invention contemplates a foundry binder system of the phenolic urethane class, wherein the binder comprises a low molecular weight phenolic resole component, a selectively reactive diluent, and preferably, a polyether polyol. The binder of the present invention is cured by reacting the binder with a hardener or cocatalyst comprising a polymeric isocyanate of the MDI type, which is used in the absence of solvents. Preferably the binder system includes a catalyst.

We have found that hydrocarbon solvents can be eliminated from a binder system by combining a compatable selectively reactive diluent with a low molecular weight phenolic component. Most surprising is that the mixture of the phenolic component and the reactive diluent can be uniformly admixed and cured with solvent free liquid polyisocyanates to give thermoset resins. In accordance with the present invention, inert hydrocarbon solvents are eliminated and the reactive diluent of the binder system does not interfere with and selectively contributes to the formation of crosslinked, thermoset resins with reduced release of environmentally harmful hydrocarbon emissions. The cured phenolic mixtures may be usefully employed as coatings and adhesives. More particularly, the binder compositions of the present invention may be used with sand or other aggregates and cured with neat solvent-free polyisocyanates, preferably in the presence of a catalyst, to make foundry cores or molds of suitably high tensile strength and good mechanical properties with reduced hydrocarbon emissions.

I. THE BINDER COMPONENT

A. The Phenolic Component

The binder component of the present invention is a mixture of low molecular weight methylolated phenols. The methylolated phenols comprise a mixture of mononuclear and dinuclear methylolated phenols and is substantially free of trinuclear or polynuclear forms. Ideally the phenolic component should be primarily mononuclear methylolated phenols, but as a practical matter it is difficult to produce methylolated phenols which are absolutely free of dinuclear or polynuclear forms using a commercially realistic process.

The methylolated phenols of this invention may be conveniently prepared in the presence of alkali base such as sodium hydroxide, potassium hydroxide and the like, at a pH greater than 7 and less than 11 and preferably between 7.5 and 9.5. The molar ratio of formaldehyde to phenol should be greater than one and less than two with the preferred ratio between 1.1 and 1.6. The methylolated phenolic mixture should be prepared at a reaction temperature less than 90° C. and preferably between 65° and 80° C. At these temperatures, the minimum reaction time is the time required to react greater than 90% of the formaldehyde. Any water in excess of 20% in the reaction mixture is removed by vacuum distillation at temperatures of less than 75° C. and preferably between 50°–60° C. These conditions give a highly desirable isomeric mixture of methylolated phenols, of suitable low molecular weight, free phenol and water, which may be used as the phenolic component.

B. Reactive Diluent

The reactive diluent used in connection with the present invention must comprise a composition having both a polar function and a non-polar function, in addition to an isocyanate reactive function. Certain aliphatic hydroxyl compounds and mixtures thereof are suitable for use as reactive diluent. The binder component comprises from 20% to 40% of reactive diluent.

The reactive diluent must have good solvency parameters for the phenolic component in order to provide a binder of suitably low viscosity, having uniform flowability and good dispersability on sand. Moreover, the reactive diluent must provide excellent dispersal, intermixing and compatable phasing of the binder and the solvent-free liquid polyisocyanates. When the binder system is admixed with the solvent-free polyisocyanate, a uniform non-competing phase system must be created enabling the polyisocyanates to react in a uniform phenolic-isocyanate reaction imparting good bonding strength to a foundry mix and the shaped article formed therefrom without hydrocarbon emissions during curing. It is postulated that the reactive diluent of the present invention should contain at least one hydroxyl group which can react with the isocyanate functionality at a later stage of the reaction without substantially interfering or competing with the phenolic-urethane reaction.

Aliphatic hydroxyl compounds having from 5 to 10 carbon atoms in the aliphatic group are preferred for use as the reactive diluent. Those aliphatic hydroxyl compounds containing less than 5 carbon atoms are generally too polar, while those containing more than 10 carbon atoms are too high in viscosity and are also generally more expensive. The aliphatic hydroxyl compounds may have more than one hydroxyl group and may include a carbonyl or ether group which tends to improve the solubility of the binder and the isocyanate.

It is preferred that the hydroxyl group of the aliphatic hydroxyl compound be a tertiary or secondary hydroxyl group. It has been found that the primary alcohols are more polar and more active as solvents for the phenolic compound, however, the primary alcohols compete more readily for the isocyanate group which seems to interfere with the tensile buildup of the overall system.

Commercially available alcohols which can be used in the invention include,

| | |
|---|---|
| Methyl Cellosolve | ethylene glycol, monomethyl ether |
| Phenyl Cellosolve | ethylene glycol, monophenyl ether |
| TXIB | From Eastman Chemical Co. (no formula) |
| Methyl Carbitol | diethylene glycol, monomethyl ether |
| Butyl Carbitol | diethylene glycol, butyl ether |
| Proposal B | butoxy propanol |
| Proposal P | propoxy-propanol |
| Proposal M | methoxy-propanol |
| Proposal DM | dipropylene glycol monoethyl ether |
| Carbitol | diethylene glycol monoethyl ether |
| Texanol | 1,3, dihydroxy 2,2,4-trimethyl pentane |
| Diacetone Alcohol | 4-methyl 4-hydroxy pentane-2-one |

C. Polyether Polyol

The phenolic component of the present invention is preferably combined with polyether polyols. While it is generally preferred to use polyether polyols as a portion of the binder composition as described above, polyether polyols are not essential. However, it has been found that the polyether polyols tend to improve the ultimate tensile strength, particularly at the later stages of curing and they may also function as an additional solvent reducing the overall viscosity of the binder system and functioning as a plasticizer in the phenolic-isocyanate reaction.

The use of polyether polyol in the present phenolic-urethane resin binder produces foundry shapes which are more readily strippable, i.e., the cured sand-binder product is somewhat flexible and can be more easily removed from the box in which it is produced. The "strippability" of a core is very difficult to demonstrate, and applicants are not aware of any test by which this can be measured, but it has been observed in the foundry. It is believed that the presence of a polyether polyol prevents the system from becoming rigid too early and thus provides a core or mold with a certain amount of flexibility for a few minutes after the curing has taken place. The polyol thus appears to slightly retard the rate of initial tensile buildup, but it does appear to contribute to the ultimate tensile strength.

The polyether polyols which may be used in the binder compositions must be poly-hydroxyfunctional liquids having a molecular weight between about 75 and 5,000. Polyether polyols used in the present invention may be prepared by reacting alkylene oxides such as ethylene oxide or propylene oxide with such precursors as propylene glycol, 1,4-butane diol to form poly(oxyalkylene) glycols, or poly(oxypropylene)-poly(oxyethylene) glycol block copolymers which may be hydroxyl terminated, or with triols such as glycerin, trimethylol propane, trimethylol ethane and castor oil to form the corresponding polyoxypropylene or polyoxyethylene adducts. Tetrols or compounds of higher functionality also may be similarly reacted. Also, polymers and copolymers prepared from hydroxyl alkyl acrylates or methacrylates with other ethylenically unsaturated monomers, poly(oxypropylene) poly(oxyethylene) and adducts of pentaerythritol or glycerine may be suitable in this invention.

II. CO-CATALYST OR HARDNER POLYISOCYANATES

The preferred polyisocyanates used in the present invention are polymeric forms of MDI [methylene bis(phenyl isocyanate)]. Such polyisocyanates, which are commercially available, have relatively low viscosity, i.e., about 150 cps and low vapor pressure.

As is known to those skilled in the art, other types of polyisocyanates may be used, including di- and tri-isocyanates. Suitable isocyanates are the aromatic, [aliphatic and cycloaliphatic] and include 4,4'-methylene bis (phenyl isocyanate); 1,4-cyclohexylene diisocyanate; 4,4'-methylene bis(cyclohexyl isocyanate); 1,5-tetrahydronaphthylene diisocyanate; toluene-2,4-diisocyanate; 4-chloro-1,3-phenylene diisocyanate; cyclohexylene-1,2-diisocyanate; m-xylene diisocyanate; and 1,6-hexamethylene diisocyanate. The isocyanates are employed in liquid form without the presence of hydrocarbon solvents and must possess sufficiently low viscosity to provide efficient flowability. Efficient coating of the sand grains can be accomplished by an isocyanate liquid possessing a viscosity of less than 400 cps and preferably less than 200.

III. CATALYSTS

The binder compositions of the present invention may be cured with polyisocyanates either with or without a catalyst, but it is preferred to use a catalyst. Conventional catalysts which promote the urethane-forming reaction, including those which are liquid and those which are gaseous, may be used. The preferred catalyst system comprises an amine catalyst in combination with a small amount of organo-metallic cocatalyst.

When a liquid catalyst system is to be used, the main catalyst may comprise any of the standard soluble urethane amino-type catalysts, although certain heterocyclic tertiary amines are preferred. In particular, 4-picoline and 4-phenyl propyl pyridine are the preferred amine catalysts which most preferably are used in combination with a small amount of an organo-metal catalyst such as dibutyl tin dilaurate. Other amines which may be used include dimethylethanolamine, diethyl cyclohexylamine, dimethylanaline, pyridine, triethyl amine, N-methyl morpholine, tetramethyl 1,3-butanediamine 1-methylimidazole, imidazole and the like. Organo-metal compounds which may be used include tin diacetates and the various tin naphthanates. The organo-tin compounds are preferred in the slightly aqueous environment of the present invention. However, other catalysts may be employed and are listed in "Polyurethane, Part I", Saunders and Frisch, page 212 (Interscience Publishers, 1962).

The present invention also contemplates the use of gaseous amines to cure the binder compositions of the present invention, but methylolated phenol mixtures of low water content are preferred for this use. Preferably the gaseous amine is a tertiary amine such as trimethylamine, although normally liquid tertiary amines such as triethylamine may be used if they are maintained in a suitably volatile form or are suspended in a gaseous medium and then passed through the mold or core. Dimethylethanol amine, triethanol amine, or other amines which have functional groups which do not interfere with the catalytic action of the amine may also be used. The gaseous amines may be used either with or without the organo-metallic co-catalyst. In the event the organo-metallic co-catalyst is to be used, it is preferably premixed with the sand and the binder composition, followed by mixing with the isocyanate solution. In this way, when the gaseous amine catalyst is brought in contact with the foundry mix, the organo-metallic co-catalyst will already be in position, thereby enabling a prompt reaction and curing of the binder composition.

As discussed above, the binder of the present invention comprises the phenolic component (Section A), the reactive diluent (Section B), and preferably the polyether polyol (Section C). While the amounts of these materials may be varied over wide proportions, it has been found that binders produced from 50-65% by weight of the phenolic component, 20-40% by weight of the reactive diluent, the balance being polyether polyol are quite useful. Preferably the reactive diluent falls within the 25-35% by weight range. The amount of reactive diluent employed will depend on the desired viscosity and flowability of the binder system to prevent uneven coating of the aggregate which can cause tensile losses. Higher amounts of diluent in the binder are advantageous where the relative ratio of a binder to isocyanate is greater than one, and preferably the reactive diluent is employed in a weight percent of 30-40 or to maintain the viscosity within 100 and 300 cps.

Phenolic components having low water levels, e.g., 3% or less, may be used with lower stoichiometric amounts of polyisocyanates and lower amounts of polyol without unduly sacrificing tensile strength buildup. It is postulated that this advantage is a consequence of preferably employing a binder having phenolic components containing less than 5% water as well as adding polyether polyols in a range of about 1 to 15% by weight of the binder which provide increased molecular weight buildup during curing.

The weight ratio of binder to isocyanate can preferably vary from 45/55 to 65/35. At the higher levels of binder, dispersability of the polyisocyanate over the sand becomes more important and hence an isocyanate liquid having a somewhat lower viscosity is required and decreased tensile strength can occur as a result of higher levels of hydroxyls which may interfere with and inhibit crosslinking. As will be seen from the examples, good work time and strip time can be achieved at higher ratios of binder to isocyanate when the amount of diluent is increased providing a polymeric system having good tensile strength buildup.

The quantity of catalyst used should be regulated to obtain the cure and strip time desired for the foundry object being produced. This depends, in part, on the quantity of binder composition used with each measure of sand and in part on the size of the core or mold being produced. Desirably the amount of catalyst and isocyanate is kept as low as possible for economic reasons, in keeping with achieving the required tensile strength to promote stripping and the required hot strength.

Although useful cores and molds may be made by using less than 1% by weight of the binder composition (exclusive of diluents), based on the weight of the sand, larger amounts may be added if higher tensile strength is required. Generally from about 0.5% to 2.5% by weight of the binder composition based on the weight of the sand or other aggregates gives useful results.

Silanes are preferably added to the binder for improving core shelf life. The commercially available silanes that are prferably employed include gamma-aminopropyl-triethoxy silane; N-beta(aminoethyl)-gamma-aminopropyl-trimethoxy silane; ureidosilane (such as the A-1100 series from Union Carbide Corporation). Additionally, silanes having the general formula: $(R'O)_3SiR$, wherein $R'$ is an alkyl hydrocarbon moiety and preferably of one to six carbon atoms and R is an alkyl moiety, an alkoxy-substituted alkyl radical or an alkylamino-substituted alkyl radical in which the alkyl groups have from one to six carbon atoms.

In applying the present invention to the foundry process, it is generally preferred to prepare three separate components, namely:
A. Binder (including the phenolic component, the reactive diluent and preferably the polyether polyol);
B. liquid polyisocyanate; and
C. catalyst.

Generally the foundry process is carried out using a high speed mixer—wherein all three components are simultaneously mixed. Alternatively, the foundry process may be carried out by first mixing the binder with an aggregate material (typically sand) for use in producing foundry cores and molds. If desired, the catalyst may be mixed with the sand at the same time the binder composition is mixed. Alternatively the binder composition and the catalyst may be pre-mixed together or mixed with the sand sequentially, in either order. Next, an appropriate quantity of liquid polyisocyanate is added to the sand-resin mixture and mixed for a time sufficient to produce a uniform foundry sand mix which is then shaped into desired articles by ramming or blowing into a pattern. The foundry sand mix rapidly cures at room temperature in the shape of the pattern as the isocyanate solution reacts with the binder resin composition.

The following examples serve to illustrate the preparation and use of several binder compositions and catalyst systems within the scope of the present invention. These examples present comparative data and it will be understood that these examples are set forth for illustrative purposes and many other binder compositions and catalyst systems are within the scope of the present invention.

EXAMPLE 1

Into a 2,000 ml glass resin kettle equipped with a reflux condenser, an agitator and a thermometer is charged 500 g (5.32 moles) of phenol and 518 g (6.29 moles) of a 37% aqueous formaldehyde solution. To the stirred reaction mixture is slowly added over 10 minutes, 20 g of a 50% aqueous NaOH solution. The reaction mixture is heated under reduced pressure (20 inches vacuum) to approximately 75° C. At this point the reaction exotherms to 70° C. The reaction temperature is held at 75° C. until the free formaldehyde is less than 1.5% as determined by the hydroxyl amine method. The reaction mixture is cooled to approximately 50° C. and the pH is adjusted to 4.5 to 5.5 by the addition of an aqueous paratoluene solfonic acid solution. Vacuum is again applied and excess water is removed at temperatures between 50°-55° C. until the water content of the phenolic mixture is approximately 10%.

Free phenol was determined by gas chromatography to be in the range of 25-35%. High pressure liquid chromatography yielded the following analysis:

|  | Wt. Percent |
| --- | --- |
| Mononuclear species | 20-35 |
| Dinuclear species | 15-30 |
| Trinuclear species | 0-10 |

-continued

| | Wt. Percent |
|---|---|
| Water | 10 |

EXAMPLE 2

Using a phenolic component prepared by the procedure given in Example 1, a phenolic binder system was prepared as follows:

| | PARTS |
|---|---|
| BINDER MATERIALS | |
| Phenolic component of Example 1 | 54.73 |
| Diacetone alcohol | 21.89 |
| Polyoxypropylene glycol (Pluracol P410 from BASF Wyandotte Corp.) | 14.93 |
| Texanol | 7.96 |
| Ureido silane (A-1160 from Union Carbide Corp.) | 0.5 |
| ISOCYANATE LIQUID | |
| Methylene bis-(phenyl isocyanate) | 100% |

A catalyst component was prepared as follows:

| CATALYST MATERIALS | PARTS |
|---|---|
| 4-Phenyl propyl pyridine | 49.75 |
| Dibutyl tin dilaurate | 0.5 |
| Diacetone alcohol | 49.75 |

A typical foundry sand mix was prepared according to the following formulation and process described below, at a sand temperature of 70°-75° F.

| MATERIALS | PARTS (in grams) |
|---|---|
| AFS testing sand (50-70 mesh) | 2000 |
| Phenolic Binder | 15 |
| Isocyanate Liquid | 15 |
| Catalyst Solution | 0.6 |

The sand, phenolic binder system and catalyst solution are mixed in a Hobart Mixer for two minutes. The liquid isocyanate is then added and mixing is continued for an additional 30 seconds. The sand mix is then poured into a "dog bone" core box, packed and the excess sand is struck off into a window box. The sand in the window box is packed and struck off.

The excess sand is placed in a pile and observed every 15 seconds until a work time is reached. The work time is established when slight agitation of the piled sand grains produces a slight "creep" after the stimulus is removed. Prior to the work time being established, the "creep" will not be observed. The strip time is determined in the same manner except a mold hardness (penetration) of 20 is defined as the strip time.

A foundry mix prepared in the above manner with the materials described has the following properties:

| Work Time | Strip Time | WT/ST | Tensiles (psi) 15 min. | 30 min. | 60 min. | 240 min. |
|---|---|---|---|---|---|---|
| 2:20" | 5:45" | .40 | 108 | 147 | 197 | 275 |

EXAMPLE 3

Into a 2,000 ml glass resin kettle equipped with a reflex condenser, an agitator and a thermometer is charged, 647 g (6.88 moles) of phenol, 249 g (7.55 moles) of 91% paraformaldehyde and 11 g 50% aqueous KOH solution. The reaction mixture is heated under reduced pressure (20" vacuum) to approximately 70° C.; at this point the reaction exotherms to 80° C. The reaction temperature is held at 80° C. until the free formaldehyde is less than 1.5% as determined by the hydroxyl amine method. The reaction mixture is cooled to approximately 55° C. and the pH is adjusted to 4.5 to 5.5 by the addition of an aqueous para-toluene-sulfonic acid solution. Vacuum is again applied and excess water is removed until the water content in the phenolic mixture is approximately 2-3%.

Free phenol was determined by gas chromatography to be in the range of 25-40%. High pressure liquid chromatography yielded the following analysis:

| | Wt. Percent |
|---|---|
| Free phenol | 30-40 |
| Mononuclear species | 20-35 |
| Dinuclear species | 15-30 |
| Trinuclear | 0-10 |
| Water | 2-3 |

EXAMPLE 4

Using a phenolic component prepared by the procedure given in Example 3, a binder was prepared as follows:

| | PARTS (% By Weight) |
|---|---|
| Phenolic component of Example 3 | 60.77 |
| Diacetone alcohol | 24.31 |
| Texanol | 8.84 |
| P-410 | 4.41 |
| Hexamethylene glycol | 1.39 |
| A-1160 (Ureido-silane, from Union Carbide Corp.) | .55 |

EXAMPLE 5

Using a phenolic component prepared by the procedure given in Example 3, a binder was prepared as follows:

| | PARTS (% By Weight) |
|---|---|
| Phenolic component of Example 3 | 57.60 |
| Diacetone alcohol | 31.40 |
| P-410 (from BASF Wyandotte) | 8.10 |
| Hexamethylene glycol | 2.40 |
| A-1160 silane | .50 |

EXAMPLE 6

Using a phenolic component prepared by the procedure given in Example 3, a binder was prepared as follows:

| | PARTS (% By Weight) |
|---|---|
| Phenolic component of Example 3 | 57.60 |

-continued

|  | PARTS (% By Weight) |
| --- | --- |
| Diacetone alcohol | 31.42 |
| P-410 Polyol (from BASF Wyandotte) | 8.11 |
| E-200 Polyol (from BASF Wyandotte) | 2.37 |
| A-1160 Silane | .50 |

EXAMPLE 7

Using a phenolic component prepared by the procedure given in Example 3, a binder was prepared as follows:

|  | PARTS (% By Weight) |
| --- | --- |
| Phenolic component of Example 3 | 54.74 |
| Diacetone alcohol | 29.86 |
| P-410 | 11.19 |
| E-200 | 3.72 |
| A-1160 | .5 |

EXAMPLE 8

The binders of Examples 4, 5, 6 and 7 were mied with the following liquid isocyanate, catalyst and sand:

| CATALYST | |
| --- | --- |
| Diacetone alcohol | 58.90% |
| 4-phenyl-propylpyridine | 39.20% |
| Dibutyl tin dilaurate | 1.94% |
| ISOCYANATE | |
| MDI (Off spec. grade) | |
| SAND | |
| 2000g. A.F.S. 50-70 mesh | |
| TOTAL REACTANTS | |
| 1.5% in all runs. | |

The sand, phenolic binder system and catalyst solution are mixed in a Hobart Mixer for two minutes. The liquid isocyanate is then added and mixing is continued for an additional 30 seconds. The sand mix is then poured into a "dog bone" core box, packed and the excess sand is struck off into a window box. The sand in the window box is packed and struck off.

The excess sand is placed in a pile and observed every 15 seconds until a work time is reached. The work time is established when slight agitation of the piled sand grains produces a slight "creep" after the stimulus is removed. Prior to the work time being established, the "creep" will not be observed. The strip time is determined in the same manner except a mold hardness (penetration) of 20 is defined as the strip time.

The following results for the foundry sand mixes were obtained:

EXAMPLE 9

Using a phenolic component, prepared according to the procedures of Example 3, a binder was prepared as follows:

|  | PARTS (% By Weight) |
| --- | --- |
| Phenolic component | 60.00 |
| Proposal B (butoxy propanol from Union Carbide) | 32.00 |
| P-410 polyol | 7.50 |
| A-1160 silane | .50 |

EXAMPLE 10

Using a phenolic component prepared by the procedure given in Example 3, a binder was prepared as follows:

|  | PARTS (% By Weight) |
| --- | --- |
| Phenolic component | 60.00 |
| Proposal P (propoxy-propanol) from Union Carbide | 32.00 |
| P-410 polyol | 5.00 |
| Hexylene glycol | 2.50 |
| A-1160 silane | .50 |

EXAMPLE 11

The binders of Examples 9 and 10 were mixed with the following liquid isocyanate, catalyst and sand and tested according to the procedure employed in Examples 2 and 8, except that a small cup was used in place of the window box to determine strip time by the penetration method:

| CATALYST | |
| --- | --- |
| 4-phenyl-propylpyridine | 19.76% |
| diacetone alcohol | 79.05% |
| dibutyl tin dilaurate | 1.19% |
| ISOCYANATE | |
| MDI (Off spec. grade) | |
| SAND | |
| 2000g Fairwater 125 | |
| TOTAL REACTANTS | |
| 1.5% in all runs. | |

The following results were observed:

TABLE II

| % Catalyst | Binder | Binder/ISO | WT | ST | Tensiles (psi) | | | |
| --- | --- | --- | --- | --- | --- | --- | --- | --- |
| | | | | | 15 min. | 30 min. | 1 hr. | 3 hrs. |
| 3 | Ex. 10 | 55/45 | 1'35 | 4'30 | 96 | 118 | 133 | 132 |
| 3 | Ex. 9 | 55/45 | 1'30 | 4'20 | 116 | 133 | 130 | 150 |

TABLE I

| % Catalyst | Binder | Weight Ratio Binder/ISO | Sand | WT | ST | Tensiles (psi) | | | |
| --- | --- | --- | --- | --- | --- | --- | --- | --- | --- |
| | | | | | | 15 min. | 30 min. | 1 hr. | 3 hrs. |
| 3 | Ex. 5 | 60/40 | 71° C. | 2'00 | 3'55 | 106 | 115 | 124 | 188 |
| 3 | Ex. 4 | 60/40 | 71° F. | 2'00 | 4'00 | 110 | 124 | 130 | 158 |
| 4 | Ex. 6 | 55/45 | 76° F. | 1'45 | 3'50 | 116 | 158 | 169 | 196 |
| 5 | Ex. 7 | 50/50 | 70° F. | 2'10 | 3'50 | 112 | 185 | 199 | 243 |

EXAMPLE 12

The results shown in Table III were observed for the foundry sand mixtures which employed the catalyst, isocyanate and sand according to the procedures of Example 8.

TABLE III

| Binder | % Catalyst | Binder/ISO | WT/ST | WT | ST | Tensiles (psi) 15 min. | 30 min. | 1 hr. | 3 hrs. |
|---|---|---|---|---|---|---|---|---|---|
| Ex. 5 | 5 | 50/50 | .45 | 2'00 | 4'50 | 116 | 140 | 156 | 220 |
| Ex. 5 | 4 | 55/45 | .46 | 1'45 | 3'50 | 116 | 158 | 169 | 196 |
| Ex. % | 3 | 60/40 | .51 | 2'00 | 3'55 | 106 | 115 | 124 | 158 |

EXAMPLE 13

Using a phenolic component prepared by the procedure given in Example 3, a binder was prepared as follows:

| | PARTS (% By Weight) |
|---|---|
| Phenolic component of Example 3 | 60.69 |
| Diacetone alcohol | 33.10 |
| P-410 | 4.27 |
| Hexamethylene glycol | 1.39 |
| A-1160 | 0.55 |

EXAMPLE 14

Using a phenolic component prepared by the procedure given in Example 3, a binder was prepared as follows:

| | PARTS (% By Weight) |
|---|---|
| Phenolic component of Example 3 | 52.37 |
| Diacetone alcohol | 31.42 |
| P-410 (from BASF Wyandotte) | 11.77 |
| E-200 (from BASF Wyandotte) | 3.92 |
| A-1160 | 0.52 |

EXAMPLE 15

Using a phenolic component prepared by the procedure given in Example 3, a binder was prepared as follows:

| | PARTS (% By Weight) |
|---|---|
| Phenolic component | 57.59 |
| Diacetone alcohol | 23.04 |
| Texanol | 8.38 |
| P-410 | 8.10 |
| E-200 | 2.37 |
| A-1160 | .52 |

EXAMPLE 16

Using a phenolic component prepared by the procedure given in Example 3, a binder was prepared as follows:

| | PARTS (% By Weight) |
|---|---|
| Phenolic component | 54.73 |
| Diacetone alcohol | 21.89 |
| Texanol | 7.96 |
| P-410 | 4.98 |
| E-200 | 9.95 |
| A-1160 | .5 |

EXAMPLE 17

Phenolic binder systems made with the binders of Examples 4, 7, 13, 14, 15 and 16, were prepared with the isocyanate liquid and the catalyst solution as described in Example 2. Foundry mixes were prepared and observed according to the procedures described in Example 8. The work time, strip time and tensile buildup of the mixes are shown in Table IV.

TABLE IV

| Binder | % Catalyst | Binder/ISO | WT/ST | WT | ST | Tensiles (psi) 15 min. | 30 min. | 1 hr. | 3 hrs. |
|---|---|---|---|---|---|---|---|---|---|
| Ex. 4 | 3 | 60/40 | .50 | 2'00 | 4'00 | 110 | 124 | 130 | 158 |
| Ex. 7 | 3 | 60/40 | .43 | 1'50 | 3'45 | 77 | 82 | 95 | 130 |
| Ex. 13 | 3 | 60/40 | .29 | 1'50 | 5'14 | 85 | 107 | 141 | 176 |
| Ex. 14 | 3 | 60/40 | .43 | 1'55 | 3'55 | 69 | 92 | 100 | 148 |
| Ex. 15 | 4 | 50/50 | .43 | 2'00 | 4'05 | 90 | 105 | 128 | 148 |
| Ex. 16 | 4 | 50/50 | .50 | 2'15 | 4'30 | 102 | 131 | 126 | 182 |

EXAMPLE 18

Using a phenolic component prepared by the procedure given in Example 3, a binder was prepared as follows:

| | PARTS (% By Weight) |
|---|---|
| Phenolic component of Example 3 | 54.78 |
| Diacetone alcohol | 7.97 |
| Texanol | 21.91 |
| P-410 (from BASF Wyandotte) | 11.19 |
| Hexamethylene glycol | 3.68 |
| A-1160 | .49 |

EXAMPLE 19

Using a phenolic component prepared by the procedure given in Example 3, a binder was prepared as follows:

| | PARTS (% By Weight) |
|---|---|
| Phenolic component | 57.6 |
| Texanol | 8.38 |

-continued

|  | PARTS (% By Weight) |
|---|---|
| Diacetone alcohol | 17.80 |
| P-410 | 11.37 |
| E-200 | 3.92 |
| A-1160 | 0.52 |

EXAMPLE 20

Using a phenolic component prepared by the procedure given in Example 3, a binder was prepared as follows:

|  | PARTS (% By Weight) |
|---|---|
| Phenolic component | 54.74 |
| Diacetone alcohol | 14.93 |
| Texanol | 14.93 |
| P-410 | 11.19 |
| E-200 | 3.72 |
| A-1160 | .5 |

EXAMPLE 21

The binders of Examples 18, 19 and 20 were employed to prepare foundry sand mixes employing the catalyst, isocyanate and sand components described in and according to the procedures of Example 8. The following results were observed according to the procedure employed in Example 8 as shown in Table V.

TABLE V

| Binder | % Catalyst | Binder/ISO | WT/ST | WT | ST | Tensiles (psi) 15 min. | 30 min. | 1 hr. | 3 hrs. |
|---|---|---|---|---|---|---|---|---|---|
| Ex. 18 | 4 | 50/50 | .49 | 2'15" | 4'35" | 81 | 109 | 149 | 160 |
| Ex. 19 | 4 | 50/50 | .49 | 1'55" | 3'55" | 85 | 88 | 130 | 132 |
| Ex. 20 | 4 | 50/50 | .43 | 2'00" | 4'40" | 84 | 109 | 112 | 129 |

EXAMPLE 22

Foundry sand mixes were prepared with a phenolic component according to Example 1 and according to Example 3. The binder formulation was the same as described in Example 2 and the catalyst and isocyanate were the same as employed in Example 8 at a sand temperature of 65° F. The following results were obtained employing the procedure of Example 8.

TABLE VI

| Binder | % Catalyst | Binder/ISO | WT | ST | Tensiles (psi) 15 min. | 30 min. | 1 hr. | 3 hrs. |
|---|---|---|---|---|---|---|---|---|
| Ex. 3 | 4 | 50/50 | 2'15" | 4'35" | 81 | 109 | 149 | 161 |
| Ex. 1 | 4 | 50/50 | 2'15" | 6'35" | 82 | 132 | 164 | 235 |

EXAMPLE 23

Using a phenolic component prepared by the procedure given in Example 3, a binder was prepared as follows:

|  | PARTS (% By Weight) |
|---|---|
| Phenolic component of Example 3 | 55.25 |
| Diacetone alcohol | 24.31 |
| Texanol | 8.4 |
| P-410 | 8.57 |
| E-200 | 2.50 |
| A-1160 | 0.55 |

EXAMPLE 24

The binders of Examples 18 and 23 were employed to prepare foundry sand mixes employing the catalyst, isocyanate and sand components described in and according to the procedures of Example 8. The following results were observed according to the procedure employed in Example 8 as shown in Table VII.

TABLE VII

| Binder | % Catalyst | Binder/ISO | WT | ST | Tensiles (psi) 15 min. | 30 min. | 1 hr. | 3 hrs. |
|---|---|---|---|---|---|---|---|---|
| Ex. 23 | 3 | 60/40 | 1'50 | 4'15 | 110 | 134 | 145 | 178 |
| Ex. 18 | 3 | 60/40 | 1'50 | 3'50 | 112 | 125 | 133 | 153 |

EXAMPLE 25

Using a phenolic component prepared by the procedure given in Example 3, a binder was prepared as follows:

|  | PARTS (% By Weight) |
|---|---|
| Phenolic component of Example 3 | 60 |
| Proposal B | 32 |
| Nyax polyol PPG 425 (polypropylene glycol, average molecular weight 425 from Dow Chemical) | 7.5 |
| A-1160 | 0.5 |
| The following cataylsts were prepared: |  |
| CATALYST 1 |  |
| Isopropyl alcohol | 79.05 |
| 4-phenyl-propylpyridine | 39.24 |
| Dibutyl tin dilaurate | 1.90 |
| CATALYST 2 |  |
| Isopropyl alcohol | 79.05 |
| 4-phenyl-propylpyridine | 19.76 |
| Dibutyl tin dilaurate | 1.90 |
| CATALYST 3 |  |
| Isopropyl alcohol | 59.64 |
| 4-phenyl-propylpyridine | 39.76 |
| Dibutyl tin dilaurate | 0.60 |

The binder described in this example was mixed with the above catalysts, and Fairwater sand in a Hobart Mixer for two minutes for a total reactants of 1.5% by weight of aggregate. MDI (off spec. grade) was added and mixing was continued for 30 seconds. The sand mix was then poured into a "dog bone" core box, packed and the excess struck off into a small cup. The sand in the cup is packed and struck off.

The excess sand is placed in a pile and observed every 15 seconds until a work time is reached. The work time is established when slight agitation of the piled sand grains produces a slight "creep" after the stimulus is removed. Prior to the work time being established, the "creep" will not be observed. The strip time is determined in the same manner except a mold hardness (penetration) of 20 is defined as the strip time.

The results observed are given in Table VIII.

TABLE VIII

| %<br>Catalyst | Binder/<br>ISO | WT | ST | WT/<br>ST | Tensiles (cps) | | | |
|---|---|---|---|---|---|---|---|---|
| | | | | | 15 min. | 30 min. | 1 hr. | 3 hrs. |
| Cat. 1<br>2.7 | 55/45 | 1:45 | 4:30 | 0.4 | 94 | 114 | 132 | 136 |
| Cat. 2<br>2.7 | 55/45 | 2:30 | 9:00 | 0.28 | 74 | 89 | 116 | 161 |
| Cat. 3<br>2.7 | 55/45 | 1:35 | 4:15 | 0.37 | 92 | 101 | 131 | 141 |
| Cat. 1<br>7.7 | 55/45 | 0:50 | 2:20 | 0.36 | 123 | 115 | 131 | 170 |

The forms of invention herein shown and described are to be considered only as illustrative. It will be apparent to those skilled in the art that numerous modifications may be made therein without departure from the spirit of the invention or the scope of the appended claims.

We claim:

1. The process of preparing shaped foundry products which comprises:
   (a) forming a foundry mix containing at least 90% by weight of a foundry aggregate having sand as a major constituent by uniformly distributing on said aggregate from about 45 to 65 parts by weight of a binder comprising a phenolic compound and from 20 to 40% by weight of a reactive diluent, said phenolic compound comprising a mixture of low molecular weight methylolated phenols and said reactive diluent comprising an aliphatic hydroxyl compound having from about 5 to about 10 carbon atoms in the aliphatic group, said binder being substantially free of hydrocarbon solvents;
   (b) mixing therewith from about 35 to about 55 parts by weight of a liquid polyisocyanate substantially free of solvents;
   (c) shaping the foundry mix in a mold; and
   (d) permitting said binder composition to react with said polyisocyanate to form a thermoset copolymer and to bind the shaped foundry mix in the absence of hydrocarbon solvents.

2. The process of claim 1 wherein said phenolic component comprises a major portion of mononuclear methylolated phenols.

3. The process of claim 1 wherein the reactive diluent is selected from the group consisting of secondary and tertiary hydroxyl groups.

4. The process of claim 1 wherein the reactive diluent is selected from the group consisting of ethylene glycol, monomethyl ether; ethylene glycol; diethylene glycol, monomethyl ether; diethylene glycol, butyl ether; butoxy propanol; propoxypropanol; methoxy-propanol; dipropylene glycol monoethyl ether; diethylene glycol monoethyl ether; 1,3, dihydroxy 2,2,4-trimethyl pentane; and 4-methyl 4-hydroxy pentane-2-one.

5. The process of claim 1 wherein the foundry mix of (a) includes from 0.1% to 15% by weight of the binder of a tertiary amine catalyst.

6. The process of claim 5 wherein the tertiary amine catalyst is selected from the group consisting of 4-phenyl propyl pyridine and 4-picoline.

7. The process of claim 5 wherein an organo-metallic cocatalyst is added to the tertiary amine catalyst.

8. The process of claim 1 wherein a gaseous amine catalyst is contacted with said shaped foundry mix.

9. The process of preparing shaped foundry products which comprises:
   (a) forming a foundry mix containing at least 90% by weight of a foundry aggregate having sand as a major constituent by uniformly distributing on said aggregate from about 45 to 65 parts by weight of a binder comprising a phenolic compound, from 20 to 40% by weight of a reactive diluent and a minor amount of a polyether polyol, said phenolic compound comprising a mixture of low molecular weight methylolated phenols, said reactive diluent comprising an aliphatic hydroxyl compound having from about 5 to 10 carbon atoms in the aliphatic groups and being substantially free of hydrocarbon solvents, and said polyether polyol having an average molecular weight between about 75 and 5000 and having an average hydroxyfunctionality between about 2 and 4;
   (b) mixing therewith from about 35 to about 55 parts by weight of a liquid polyisocyanate substantially free of hydrocarbon solvents;
   (c) shaping the foundry mix in a mold; and
   (d) permitting said binder composition to react with said polyisocyanate to form a thermoset copolymer and to bind the shaped foundry mix in the absence of hydrocarbon solvents.

10. The process of claim 9 wherein said phenolic compound comprises less than 20% by weight of water and a major portion of mononuclear methylolated phenols.

11. The process of claim 9 wherein said binder comprises from 50 to 65% of the phenolic component.

12. The process of claim 9 wherein the reactive diluent is selected from the group consisting of secondary and tertiary hydroxyl groups.

13. The process of claim 9 wherein said foundry mix of (a) includes a tertiary amine catalyst.

14. The process of claim 13 wherein the tertiary amine catalyst is selected from the group consisting of 4-phenyl propyl pyridine and 4-picoline.

15. The process of claim 13 wherein an organo-metallic cocatalyst is added to the tertiary amine catalyst.

16. The process of claim 9 wherein a tertiary amine catalyst is added to the foundry mix following the mixing of the polyisocyanate (b) with the foundry mix (a).

17. The process of claim 12 wherein the reactive diluent is selected from the group consistint of ethylene glycol, monomethyl ether; ethylene glycol; diethylene glycol, monomethyl ether; diethylene glycol, butyl ether; butoxy propanol; propoxy-propanol; methoxypropanol; dipropylene glycol monomethyl ether; diethylene glycol monomethyl ether; 1,3, dihydroxy 2,2,4-trimethyl pentane; 4-methyl 4-hydroxy pentane-2-one.

18. The process of preparing a shaped foundry product which comprises forming a foundry mix by admixing:
   at least 90% by weight of a foundry aggregate having sand as the major constituent;
   from about 45 parts by weight of a binder comprising a major amount of a phenolic compound and from 20 to 40% by weight of a reactive diluent, said phenolic compound comprising a mixture of low molecular weight methylolated phenols, said reactive diluent comprising an aliphatic hydroxyl compound having from about 5 to about 10 carbon atoms in the aliphatic group, said binder being substantially free of hydrocarbon solvents;

from about 35 to about 55 parts by weight of a liquid polyisocyanate substantially free of hydrocarbon solvents;

shaping said foundry mix; and permitting said binder composition to react with said polyisocyanate to bind the shaped foundry mix in the absence of hydrocarbon solvents.

19. The process of preparing a shaped foundry product, as described in claim 18, wherein said polyisocyanate is mixed with the foundry aggregate prior to mixing said binder therewith.

20. The process of preparing a shaped foundry product which comprises forming a foundry mix by admixing:

at least 90% by weight of a foundry aggregate having sand as the major constituent;

from about 45 parts by weight of a binder comprising a major amount of a phenolic compound and from 20 to 40% by weight of a reactive diluent, said phenolic compound comprising a mixture of low molecular weight methylolated phenols, said reactive diluent comprising an aliphatic hydroxyl compound having from about 5 to about 10 carbon atoms in the aliphatic group, said binder being substantially free of hydrocarbon solvents;

from about 35 to about 55 parts by weight of a liquid polyisocyanate substantially free of hydrocarbon solvents;

a tertiary amine catalyst;

shaping said foundry mix; and permitting said binder composition to react with said polyisocyanate to bind the shaped foundry mix in the absence of hydrocarbon solvents.

21. The process of preparing a shaped foundry product, as described in claim 20, wherein said polyisocyanate is mixed with the foundry aggregate prior to mixing said binder therewith.

* * * * *